United States Patent [19]

Newcomb

[11] 4,284,263
[45] Aug. 18, 1981

[54] TEMPERATURE-COMPENSATED CONTROL VALVE

[75] Inventor: Clive V. Newcomb, Horley, England

[73] Assignee: U.S. Philips Corporation, New York, N.Y.

[21] Appl. No.: 36,617

[22] Filed: May 7, 1979

[30] Foreign Application Priority Data

May 8, 1978 [GB] United Kingdom ............... 18209/78

[51] Int. Cl.³ ............................................. F16K 31/02
[52] U.S. Cl. .................................... 251/129; 251/368; 137/468
[58] Field of Search ................ 251/129, 368; 137/468; 403/30, 29

[56] References Cited

U.S. PATENT DOCUMENTS 3,055,631  9/1962  Kippenhan ........................... 251/129
4,172,581  10/1979  Lobach ................................. 251/11

Primary Examiner—Arnold Rosenthal
Attorney, Agent, or Firm—David R. Treacy

[57] ABSTRACT

A control valve having an actuating member supported within and between a closed end and a seat end of a housing, the actuating member having a fixed end connected to the close housing end and a free end connected to a movable valve body, the actuating member including an elongated piezoelectric element having a relatively low thermal coefficient of expansion. The housing is made from common, inexpensive materials having moderately higher thermal coefficient of expansion, and the actuating member includes a spacer having a high thermal coefficient of expansion, arranged between the closed housing end and the piezoelectric element. By proper dimensioning of the spacer and housing with respect to the piezoelectric element, temperature compensation may be achieved without the use of exotic materials.

3 Claims, 6 Drawing Figures

TEMPERATURE-COMPENSATED CONTROL VALVE

The invention relates to a control valve such as a servovalve or fuel injection valve for controlling flow of a medium. The valve comprises a housing which is provided with an inlet duct and an outlet duct and, a movable body which can reciprocate in order to control communication between the inlet and the outlet ducts, and drive means for the reciprocating movement of the body.

Control valves of the kind set forth are known. They include inter alia servovalves for controlling medium flows in servosystems such as may be used, for example, in numerical control systems, in the process industry, the aircraft industry etc. Also included are fuel injection valves which are used for fuel injection in internal combustion engines.

A known valve of this kind includes a piezoelectric actuating member supported in a valve housing, the housing having an inlet duct and an outlet duct and a movable body which can be displaced by the actuating member in order to control in operation a flow of pressurized fluid through a connection between the inlet and outlet ducts, the surfaces of the movable body on which pressurized fluid can produced hydrostatic force being arranged to minimise any resulting hydrostatic force in a direction tending to oppose movement of the actuating member.

With a valve of the kind described hereinbefore, the possible extension of the piezoelectric element and thus the potential stroke of the valve is usually small, for example, of the order to 10 or 20 micrometers. It is therefore essential to minimize the effect of thermal expansion on the valve parts so that the flow through the valve will vary only slightly with changes of ambient temperature. One solution to the problem is to choose a material for the valve housing which material has a similar thermal expansion coefficient to that of the piezoelectric element. An example of such a material is a nickel-iron alloy having a low coefficient of thermal expansion. A possible disadvantage to the use of this material is the high cost of the alloy.

It is the object of the invention to provide an alternative construction for a control valve which can enable the effects of thermal expansion to be reduced without requiring the use of comparacitvely costly constructional materials.

The control valve according to the invention, is characterized in that a part of the actuating member consists of a spacer or distance piece of a different non-piezoelectric material having such a coefficient of thermal expansion that with temperature variations the linear expansion of the actuating element and distance piece together is equal to that of the housing, the free end of the actuating member thereby remaining in a substantially fixed position with respect to the valve end of the housing.

Preferably, the distance piece is located in a position between the actuating element and the closed housing end. The actuating member at its free end may carry an end piece for displacing a movable body of the valve.

By way of example, a particular embodiment of the invention will now be described with reference to the accompanying drawings, in which.

Figure 1:
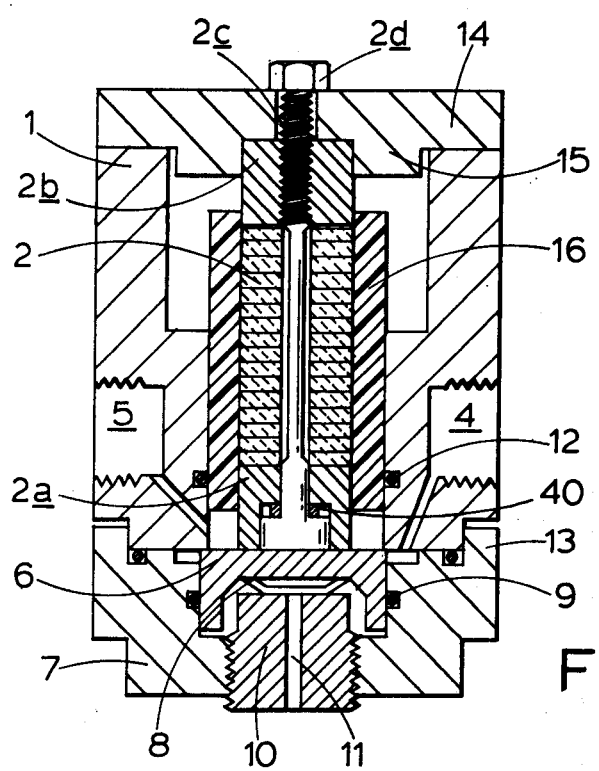
FIG. 1 is a cross-sectional view of the known control valve.

The valve shown in FIG. 1 comprises a valve body 1 which was machined from a nickel iron alloy, such as was Nilo K alloy, having a similar thermal expansion coefficient to that of the material of the piezoelectric actuating element 2. This provision was made in order to minimize variations of valve opening with temperature.

The piezoelectric actuating element 2 is assembled from a stack of fifty discs of a suitable ceramic material. A stack of this size had been found to give a sufficiently large valve opening for controlling the necessary fuel flow to an automobile engine.

Electrical signals can be applied to the actuating element 2 via an electrical connector (not shown).

The valve body 1 includes an inlet duct 4 and an outlet duct 5. Between the two ducts, a valve seat is provided against which a disc-shaped movable body 6 rests. The movable body 6 is accommodated in a valve head 7 which is attached to the valve body 1 by bolts (not shown). A disc spring 8 acts to press the movable body 6 against the seat so that the valve is held in a normally closed condition. Of course, it requires a small force to overcome the tension of the disc spring 8 upon lifting the movable body 6 off its seating, but this force is of a constant value and can be readily allowed for in designing the electrical actuating means of the valve.

Around an outer periphery of the movable body 6, a sealing member 9 is provided which in this embodiment is an O-ring seal.

The provision of a sealing member in this position means that fluid passing through the valve is prevented from exerting hydrostatic pressure on the valve in a direction towards the piezoelectric actuating element 2. Such a hydrostatic pressure would adversely influence the opening action of the movable body 6.

The lower end of the actuating member carries a metal pad 2a which rests against the movable body 6. Elongation of the actuating member, by means of the application of a suitable electrical signal to the element 2 at the connector, will thus cause the movable body 6 to be moved downwards against the force of spring 8 so that fluid under pressure can flow from inlet duct 4, along the movable body 6, and out of the outlet duct 5. The hydrostatic pressure in the fluid will not have any significant effect on the opening movement of the movable body 6, since said pressure only acts on a small annular area of the outer periphery of the movable body 6.

When the electrical signal is removed, the actuating element 2 becomes reduced in length so that the movable body 6 returns to its seating under the action of the disc spring 8. The fluid flow through the valve is then cut off again.

The valve head 7 has an adjusting screw 10 which enables the force applied by the spring 8 to be adjusted. The spring 8 can be inserted via the hole for screw 10 after main assembly of the valve parts and this also allows the spring to be replaced without dismantling the valve.

A hole 11 in the adjusting screw 10 enables the deflection of the movable body 6 to be measured externally while a fluid in the valve is held at its working pressure. The movable body 6 is in the form of a disc which has been hollowed out to reduce its mass and thus reduce the response time of the valve. The hollow shape of the disc also provides a means for locating the spring 8 with precision.

The piezoelectric actuating member is bolted to an end plate 14 which is in turn fixed to the housing 1 by four bolts (not shown). The removable end plate 14 simplifies the connection of the piezoelectric actuating member 2 to the electrical connector (not shown) which is located at the top of the housing.

The piezoelectric actuating element 2 is encapsulated in a body 16 of a suitable material to form a cylinder shape and which provides a smooth sealing surface for contact with the sealing member 12. One suitable encapsulating material is an epoxy resin composition which has a dielectric constant of approximately 12 kilovolts per millimeter. In addition, the epoxy resin is resistant to chemical attack and gives a more robust construction for the actuating member.

As already explained, the piezoelectric actuating element 2 is assembled as a stack which in this embodiment is held together by means of a longitudinal clamping bolt 2c which secures the ceramic discs between end pieces 2a and 2b. This construction is found to be advantageous because it enables a compressive pre-stress to be applied to the stack so that the tensile stress in the stack which occurs when the length is suddenly reduced, remains small.

The upper part of the bolt 2c is screwthreaded so that the actuating member can be fixed to the end plate 14 of the valve body by means of a nut 2d. The lower end piece 2a is provided with a sealing member 40 located under a head of the bolt 2c. The sealing member 40 acts to prevent pressurized fluid from leaking into the interior of the actuating member.

Figure 2:
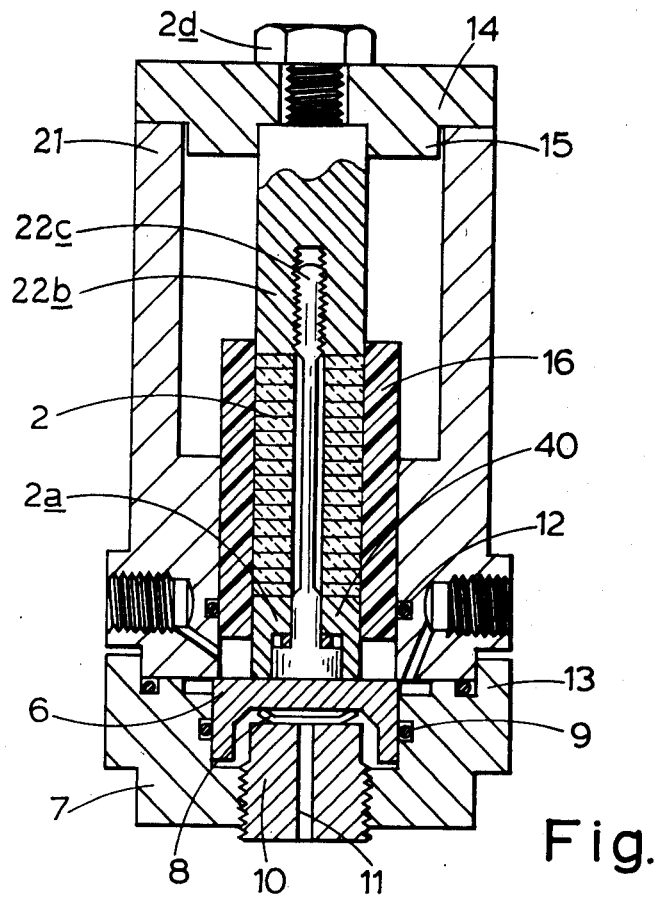
FIG. 2 is a similar view of the valve of the present invention.

FIG. 2 shows the control valve of the present invention and in this Figure the components of the valve have been given the same reference numerals as those in FIG. 1 where there is no significant change in configuration.

In the embodiment of FIG. 2 the valve body 21 was made from steel having a thermal expansion coefficient of 12 $\mu$m K$^{-1}$. The lower end piece 2a of the actuating member is made of the same material.

The piezoceramic material forming the actuating member 2 has a thermal expansion coefficient of 4 $\mu$m K$^{-1}$.

An upper end piece or spacer 22b of the actuating member is made from aluminum having a thermal expansion coefficient of 23 $\mu$mK$^{-1}$. The end piece 22b is of greater length than that depicted in FIG. 1, and incorporates means, such as a tapped hole, for retaining the upper part of the bolt 22c which clamps the element 2.

The length of the aluminum end piece 22b is determined as follows. In operation of the valve any thermal expansion of the steel valve body 21 and end plate 14 would result in the distance between the side with the plate 14 and the open side of the valve housing becoming larger. The same temperature change would cause the aluminum end piece or spacer 22b, the element 2 and the lower end piece 2a to expand in a direction away from the end plate 14. The axial lengths of the parts 22b, 2 and 2a can be calculated so that the thermal expansion coefficient of these parts together corresponds to that of the body 21 and end plate 14.

In this way, the lower surface of the lower end piece 2a where it makes contact with the movable body 6 can be maintained in a substantially fixed position with respect to the seat end of valve housing 21 even though changes in the temperature of the valve may take place.

The results of measurements made on the valve shown in FIG. 2 are given in the graphs of FIGS. 3 to 6.

Figure 3:
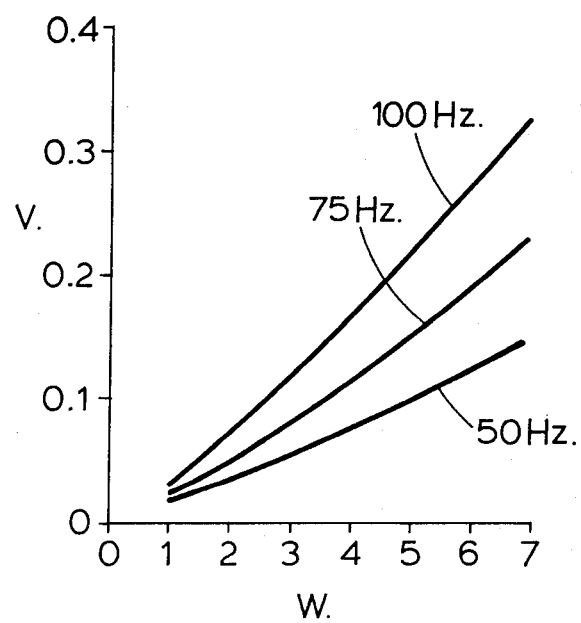
FIGS. 3 to 6 are graphs of the characteristics of the valve of FIG. 2.

FIG. 3 shows on a vertical axis liquid flow rate (V liters per minute) against a variable pulse width (W in milliseconds) of the actuation of the piezoelectric element 2. The measurements were made using a fuel line inlet pressure of 0.7 MPa and with 400 volt pulses applied to the piezoelectric actuating element. The liquid passing through the valve was SPB 11 fuel which has similar properties to petrol. The graph shows the results of three series of measurements that were carried out, with the variable width pulses repeated at frequencies of 50, 75 and 100 Herz.

Figure 4:
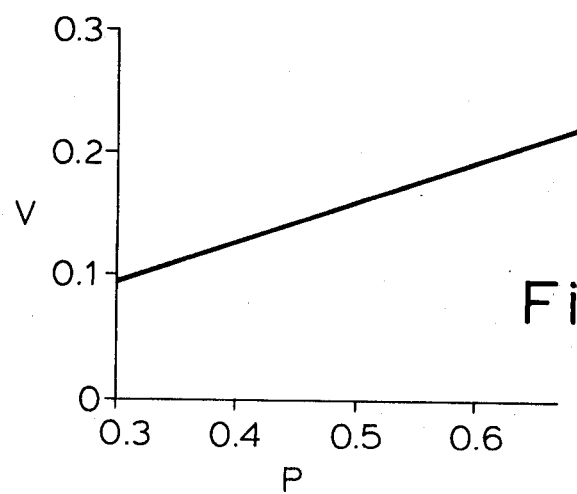

FIG. 4 shows on a vertical axis liquid flow rate (V liters per minute) against a variable value inlet pressure (P in mega-pascals) on the horizontal axis. The relationship obtaines indicates that a laminar flow is present.

Figure 5:
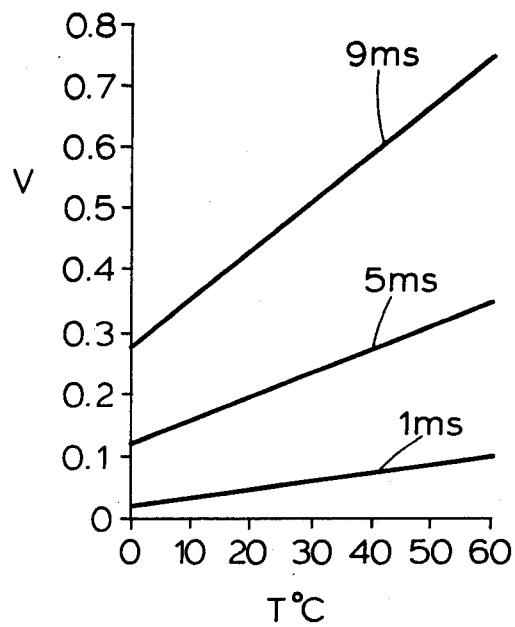

FIG. 5 shows on the vertical axis liquid flow rate (V liters per minute) against temperature (T° C.) at three pulse widths indicated by lines corresponding to 1,5 and 9 milliseconds. As before, the measurements were made using a fuel line inlet pressure of 0.7 MPa and with 400 volt pulses applied to the piezoelectric actuating element.

Figure 6:
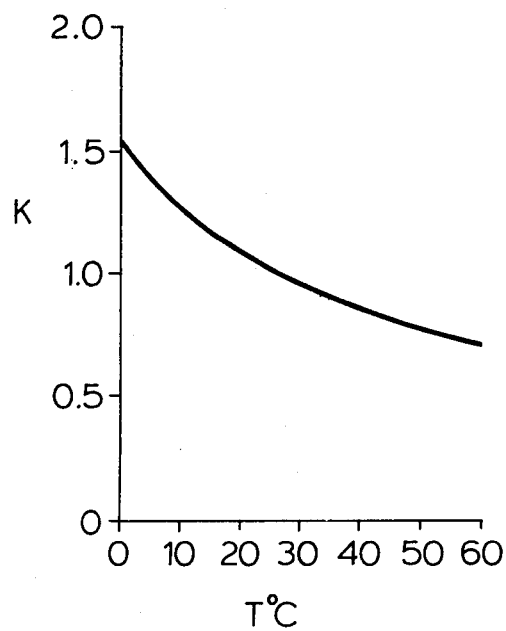

FIG. 6 shows the variation of the kinematic viscosity K (in meters 2 per second units) with variation of the temperature (T° C.) for the SPB11 fuel used. As usual, the fuel viscosity decreases with increasing temperature.

The foregoing description of an embodiment of the invention has been given by way of example only and a number of modifications may be made without departing from the scope of the invention as defined by the appended claims. For instance, it is not essential that the combinations of two metals selected to give the required thermal expansion coefficients should be limited to mild steel and aluminum. Another possible combination is brass and copper.

What is claimed is:

1. A temperature-compensated control valve comprising an actuating member having a fixed end and a free end, including an elongate piezoelectric element arranged in a longitudinal direction; a housing surrounding the actuating member and having a closed end connected to said fixed end, and a seat end; an inlet duct and an outlet duct; a movable body arranged to control communication between said ducts responsive to reciprocation of the body longitudinally with respect to said seat end; and means for reciprocating the movable body responsive to movement of the free end of the actuating member, wherein between said closed end and said seat end the housing has a coefficient of thermal expansion greater than the coefficient of thermal expansion of said piezoelectric element, and said member comprises a spacer arranged longitudinally at one end of the element, and formed of a non-piezoelectric material having a coefficient of thermal expansion greater than the coefficients of thermal expansion of the housing and piezoelectric element, the length of composition of the spacer being selected such that the actuating member has a coefficient of expansion equal to that of the housing.

2. A valve as claimed in claim 1, wherein said spacer is arranged at the fixed end of the actuating member between the housing closed end and the piezoelectric element.

3. A valve as claimed in claim 1 or claim 2, wherein the housing is made of steel and the spacer is made of aluminum.

* * * * *

UNITED STATES PATENT AND TRADEMARK OFFICE
CERTIFICATE OF CORRECTION

PATENT NO. : 4,284,263

DATED : August 18, 1981

INVENTOR(S) : CLIVE V. NEWCOMB

It is certified that error appears in the above—identified patent and that said Letters Patent is hereby corrected as shown below:

Claim 1, Line 22, (Col. 4, Line 59) change "of composition" to --and composition--.

Signed and Sealed this

Thirteenth Day of April 1982

[SEAL]

Attest:

GERALD J. MOSSINGHOFF

Attesting Officer  Commissioner of Patents and Trademarks